(12) United States Patent
Meany et al.

(10) Patent No.: US 7,893,717 B1
(45) Date of Patent: Feb. 22, 2011

(54) CIRCUIT DIE TO CIRCUIT DIE INTERFACE SYSTEM

(75) Inventors: Thomas Meany, Co. Limerick (IE); Paul Wright, Co. Limerick (IE)

(73) Assignee: Analog Devices, Inc., Norwood, MA (US)

( * ) Notice: Subject to any disclaimer, the term of this patent is extended or adjusted under 35 U.S.C. 154(b) by 164 days.

(21) Appl. No.: 12/215,353

(22) Filed: Jun. 26, 2008

Related U.S. Application Data

(60) Provisional application No. 60/959,214, filed on Jul. 12, 2007.

(51) Int. Cl.
*H03K 19/0175* (2006.01)
*H03B 1/00* (2006.01)
*G06F 13/12* (2006.01)

(52) U.S. Cl. .............................. 326/82; 327/108; 710/70
(58) Field of Classification Search .................. None
See application file for complete search history.

(56) References Cited

U.S. PATENT DOCUMENTS

| 7,296,124 | B1* | 11/2007 | Falik | 711/157 |
| 7,680,966 | B1* | 3/2010 | Falik et al. | 710/45 |
| 2004/0117702 | A1* | 6/2004 | Meany | 714/726 |
| 2005/0127942 | A1* | 6/2005 | Smith et al. | 326/38 |
| 2009/0227205 | A1* | 9/2009 | Rofougaran | 455/41.1 |

* cited by examiner

*Primary Examiner*—Vibol Tan
*Assistant Examiner*—Dylan White
(74) *Attorney, Agent, or Firm*—Kenyon & Kenyon LLP

(57) ABSTRACT

A circuit die to circuit die interface system includes a first circuit die with a first circuit having a first default signal, at least a second circuit die with a second circuit having a second default signal; and a logic circuit disposed on one of the first and second circuit dies and enabled by a default signal from all but one of the circuits to transmit a communication signal from the remaining circuit.

22 Claims, 4 Drawing Sheets

CIRCUIT DIE TO CIRCUIT DIE INTERFACE SYSTEM

RELATED APPLICATIONS

This application claims benefit of and priority to U.S. Provisional Application Ser. No. 60/959,214 filed Jul. 12, 2007 incorporated herein by this reference.

FIELD OF THE INVENTION

This invention relates to a die to die interface system.

BACKGROUND OF THE INVENTION

In some applications it is required that a high voltage or primary circuit die support one or more low voltage secondary dies so that the low voltage circuit dies are buffered from high voltages and can be made much more inexpensively. In one automotive application the primary circuit die interfaces with the 12 volt vehicle power supply while the secondary circuit die(s) interfaces only with the low voltage side of the primary circuit die.

Typical high voltage sensor interfaces in automotive applications are LIN, SENT or PWM. Each of these interfaces is based on an open collector output and an external pullup resistor (in practice will have additional circuits for buffering and emc). In response to a low voltage control signal the open collector device is hard on and pulls the output low or is off and lets the output float high. If the pullup resistor is to 12V then the open collector device and pullup resistor functions as a level shifter from typical digital logic voltage levels of 0, 3.3V to typical automotive voltage levels of 0 to 12V.

PWM and SENT interfaces are unidirectional and only transmit data. For a PWM the data is transmitted based on the pulse high or low time. e.g. if only transmitting temperature then the output format could be a 50 mS high time followed by a low time which is 10 mS+1 mS for every degree the temperature exceeds −40'c. If a PWM must transmit multiple parameters then many elaborate schemes are available such as one where a 50 mS high time is followed by low time representing the temperature as before and then a 100 mS high time followed by the second parameter represented by the low time. The high time therefore indicates to a knowledgeable receiver which parameter is being transmitted next.

The SENT (single edge nibble transmission) interface is described in SAE J2716. In is considered a lower cost version of CAN or LIN but with advantages over a PWM. Similar to a PWM it is unidirectional and only transmits data. The sensor signal is transmitted as a series of pulses measured from falling edge to falling edge. These include a calibration/synchronization pulse, 4 bit data pulses followed by a CRC pulse.

LIN (Local interconnect network) is a $3^{rd}$ common low cost automotive interface and is controlled and specified by the LIN consortium. It is bidirectional with a master/slave organization where the master initiates all transactions. All slaves have a unique ID and the master interrogates individual slaves for the data it requires. In LIN this unique ID is referred to as a PID. The addressed slave responds with packets of data. The LIN physical interface is similar to that for the PWM and SENT interfaces being basically an open collector output with additional constraints on slew rates, pulse widths, rise times etc. However it also contains a circuit, typically a resistor divider and comparator to convert received LIN signals from the high to low voltage domains. The term high voltage transceiver will now be used to describe the LIN physical block in recognition that one such block can be used for all three interfaces. In addition the high voltage LIN physical block there is also a block referred to as a LIN digital block which is effectively a UART. Typically the LIN digital block converts serial data received from the LIN physical block into bytes of data which can be easily read by a uC or such and converts bytes of data from the uC into a serial format suitable for sending on the LIN physical. The LIN digital block would also take care of LIN sync, LIN break and the other protocol elements required by the LIN bus specification. e.g. CRC. The LIN digital block has a least one input RX and a least one output TX. The RX input normally comes from the LIN physical block and the TX output normally drives an input of the LIN physical block. The digital block will be different for the LIN, PWM and SENT interfaces. Hereafter only one block labeled "LIN DIGITAL" may be shown but the die may contain three or more user selectable digital blocks which can be selected to interface with the HV transceiver.

For example the primary circuit die could be an oil change indicator for monitoring pressure and temperature, while the secondary circuit die(s) monitor e.g., density, viscosity. The primary die interface method could be PWM, SENT or LIN. As secondary die(s) are added they generally need to communicate with the primary circuit die and/or external circuits. This requires a number of connections for power and communications. One way to maintain such communications between primary and secondary dies is with UARTs, but that requires a pair of UARTs for each secondary die. This provides for external communications to be received and processed by the primary circuit die then retransmitted to the designated secondary circuit die and that secondary circuit die must then process the communications and respond to the primary circuit die which then processes and transmits the communication to the external circuit originator. This requires many inter die connections between the primary and secondary dies. In addition the software on the primary die must be modified to control communications with the secondary dies. Software modification in itself either rules out or greatly exaggerates the use of a state machine as the control logic and requires something more flexible like a micro controller. The reduction in the number of interconnects is especially important if the two or more die are combined in one package and high temperatures or other aspects of a harsh environment disallow the use of a laminate or similar to facilitate multi layer interconnects. Alternatively, both the primary and each secondary circuit die could have high voltage processing circuits but that adds cost, complexity and requires more area.

SUMMARY OF THE INVENTION

It is therefore an object of this invention to provide an improved circuit die to circuit die interface system.

It is a further object of this invention to provide such an improved circuit die to circuit die interface system wherein each circuit die can communicate with external circuits.

It is a further object of this invention to provide such an improved circuit die to circuit die interface system which reduces connections between the circuit dies.

It is a further object of this invention to provide such an improved circuit die to circuit die interface system in which each of the primary circuit die and one or more secondary circuit dies may operate singly or as a part of a package of dies without customizing software.

It is a further object of this invention to provide such an improved circuit die to circuit die interface system in which secondary circuit dies may operate on lower voltage than the primary circuit die.

The invention results from the realization that an improved, simpler circuit die to circuit die interface can be achieved by employing the default signals from each circuit die to enable a logic circuit to transmit a communication from the one circuit die not producing a default signal.

The subject invention, however, in other embodiments, need not achieve all these objectives and the claims hereof should not be limited to structures or methods capable of achieving these objectives.

This invention features a circuit die to circuit die interface system including a first circuit die with a first circuit having a first default signal, at least a second circuit die with a second circuit having a second default signal, and a logic circuit disposed on one of the first and second circuit dies and enabled by a default signal from all but one of the circuits to transmit a communication signal from the remaining circuit.

In a preferred embodiment the first and second default signals may have the same level. The level may be a logic high. The logic circuit may include an AND circuit. The first circuit may include a first LIN digital circuit which has the logic high default level and a LIN high voltage transceiver. Each second circuit may include a second LIN digital circuit. The first and second LIN digital circuits may provide the first and second default signals. The logic circuit may be disposed on the first circuit die. There may be a plurality of second circuit dies, all but one includes a logic circuit, all the logic circuits on the first and second circuit dies may have two inputs and they may be cascade connected. There may be a plurality of second circuit dies, and the logic circuit may receive as an input the default signals from each of the first and second circuit die. The first circuit die may include control logic. The first circuit die may further include a PWM transceiver circuit. The first circuit die may further include first, second and third muxes and the control logic enables the muxes to selectively connect the PWM transmitter output to the high voltage LIN transmit input and the high voltage LIN receive output to the LIN digital receiver input or connect the logic circuit output to high voltage transmit input and the LIN digital receiver input for enabling the first and second circuit dies to communicate internally with each other.

This invention also features an interface system including two die in one package including a first die containing a LIN physical device and a LIN digital block, SENT digital and PWM digital blocks, and a second die containing a LIN digital block. A first logic circuit disposed on the first die combines the outputs of the LIN digital blocks from the two die, and a second logic circuit disposed on the first die allows the combined LIN digital output, the PWM output or the SENT output to drive the transmit input of the LIN physical block. A third logic circuit disposed on the first die routes either the receive output of the LIN physical block or the output of the first logic circuit to the receive input of the LIN digital blocks.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
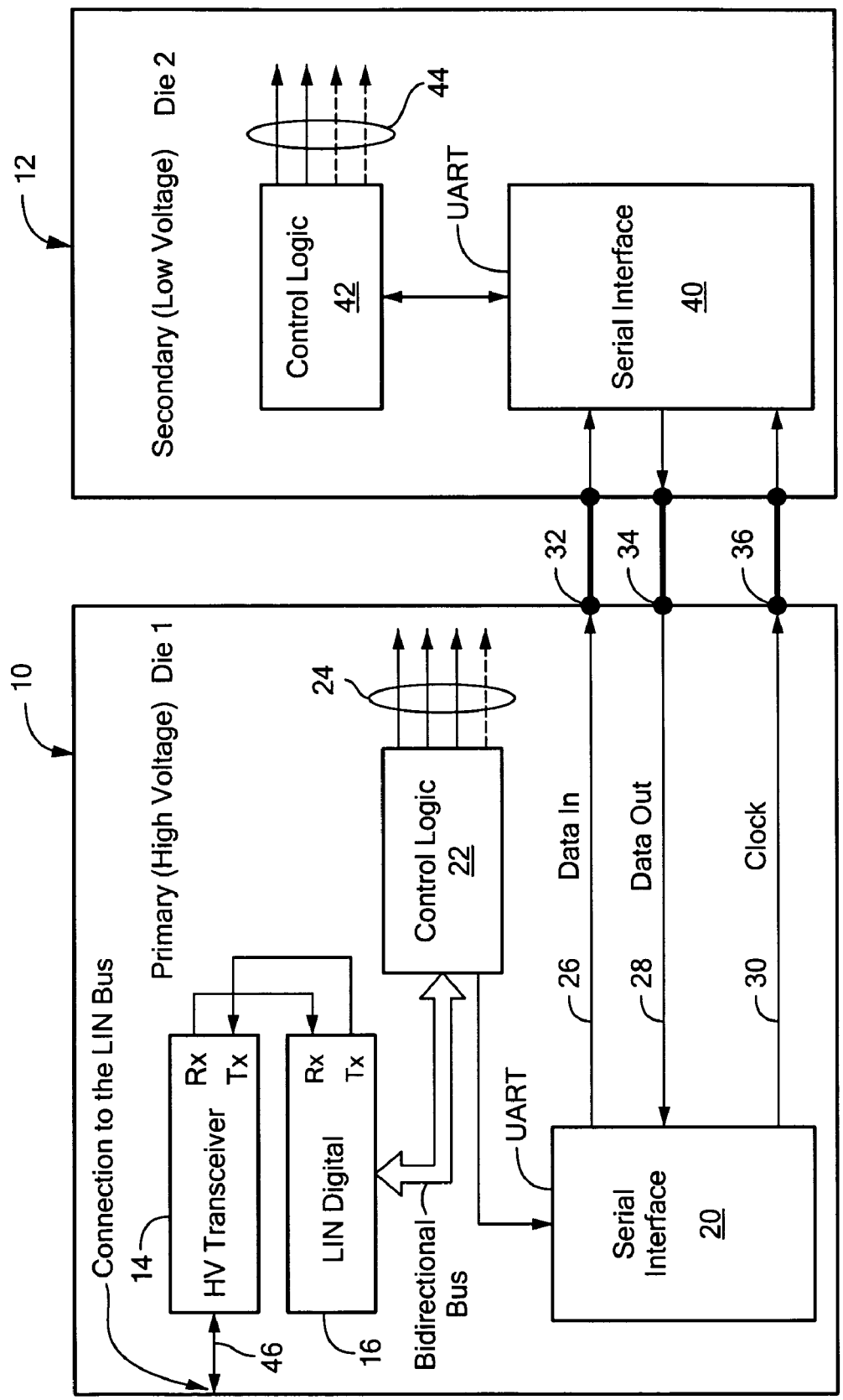
FIG. 1 is a schematic block diagram of a prior art circuit die to circuit die interface.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

This invention permits an external system to communicate to two or more die in a single package. The embodiment herein uses a LIN bus. When communication to the external world is not via LIN the two die can internally communicate using the available LIN circuits. In addition both die could be packaged separately and with no or minimal software changes operate in a stand alone mode. Effectively, the invention allows two die in one package to have access to a single interface. When the interface is LIN then either die can respond to a request from a LIN master. In this mode both dies share a single LIN physical interface which only needs to exist on the die actually connected to the outside world. Each die could run its own algorithm and not have to allow for the existence of the second die. This means that each die can run stand alone or as a part of a system in a package without software changes. A minimum of extra circuitry is required on either die. The interface could be used for programming or calibration of both chips and thereafter the interface could be only an internal die to die interface. In that case one die would be master and the other slave. The interface is used to transmit data to the die connected to the external world for transmission over a separate interface such as PWM or SENT. The invention may be implemented using a number of different protocols, LIN (local interconnect network), PWM (pulse width modulated), SENT (single edge serial transmission). These interfaces have been described earlier in the Background of Invention. Further they all share the same open collector and high voltage circuits (HV transceiver) but with different logic circuits used to compose the sequence of pulses to be sent to the open collector device. In the following sections this low voltage logic will be shown as "LIN digital", "PWM" and "SENT".

There is shown in FIG. 1 a prior art system for facilitating communications between two dies and an external master. A first primary high voltage die 10 and one or more secondary low voltage dies 12. Die 10 has LIN circuit including an HV transceiver circuit 14 and a LIN digital circuit 16. There is also a serial interface 20 implemented by a UART three wire device, for example. Control logic 22 operates the various components and has one or more lines 24 connected to sensors which monitor various quantities. The control logic could be an 8052 based micro controller (uC) or a state machine. For example, in an automotive setting perhaps oil temperature and pressure. The control logic may be hardwired to perform a pre-determined operation or may contain a memory block to allow a program and or calibration values to be downloaded over the LIN bus. Such program and calibration storage circuits, including flash memory and EPROM, are well known in the art. UART 20 provides a data in line 26, data out line 28, and clock line 30 connected to pins 32, 34 and 36, respectively. Secondary die 12 also includes a serial interface 40, such as UART and control logic 42 also having one or more lines 44 connected to sensors of quantities to be monitored. For example, in this specific example oil viscosity, and density. In operation the signal input on line 46 to high voltage transceiver 14 is delivered from its RX output to the RX input of LIN digital circuit 16. From there it is transmitted to control logic 22.

Assuming for sake of example that the input sought a parameter sensed on one of lines 24 then control logic 22 would simply retrieve that information, process it, and deliver it to LIN digital 16 which would forward it to the TX input of HV transceiver 14 which would then place it on line 46. HV transceiver 14 converts the low voltage signal, occurring in the circuits involving control logic 22, serial interface 20, LIN digital 16, to the higher voltage, for example, the 12 volts prevalent in an automotive system.

If the signal is recognized by control logic 22 as seeking a quantity sensed, not by its sensor lines 24, but by the sensor lines 44 of control logic 42 on secondary die 12, then it activates UART 20 to forward that information through UART 40 to control logic 42 which then extracts the information on the suitable lines 44, processes it, returns it to UART 40 which then transmits it to UART 20 on primary die 10 where it is returned to control logic 22 which then puts it out to LIN DIGITAL 16 to transceiver 14 and onto line 46. This communication approach requires typically three connections and the circuits on die 12 must communicate only through the UARTs. The external circuits do not see the circuits on die 12, rather they perceive that all activities and communications originate from die 10. One of the shortcomings with this approach is that any time the secondary die is changed or one or more secondary dies are added to the group, the software must be changed in order to allow the communications to go on unimpeded. Alternatively if operating with PWM or SENT interfaces, die 10 at intervals polls die 12 so that it has the data from die 12 available on die 10 when needed for transmission. The data is then transmitted not at the request of an external master but at intervals decided by control logic 22. It is also possible that die 12 could push the data on die 10.

Figure 2:
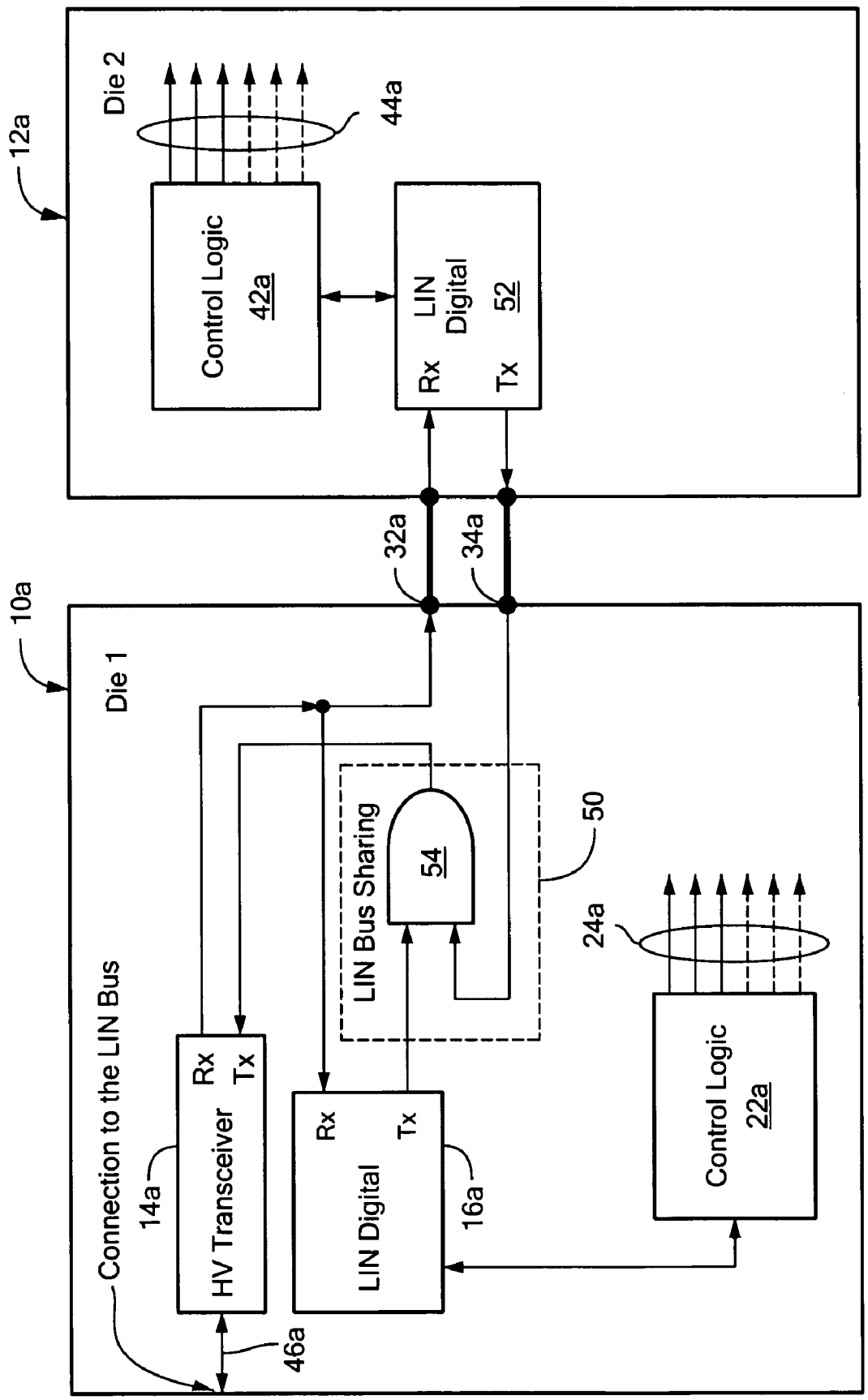
FIG. 2 is a schematic block diagram of a circuit die to circuit die interface system according to this invention.

In accordance with this invention, FIG. 2, the serial interface or UARTs 20 and 40 have been eliminated and dies 10*a* and 12*a* now communicate over only two lines as shown at pins 32*a* and 34*a*. Throughout FIG. 2 and following, like parts have been given like numbers and similar parts like numbers accompanied by a lower case letter. In FIG. 2 the PWM and SENT blocks have been omitted for clarity but may still be a part of the circuitry on 10*a*. There has now been added a logic circuit 50 on die 10*a* and LIN digital circuit 52 on die 12*a*. This circuit functions to combine the transmit signals from both dies. In LIN systems there is a handshake protocol that prevents one LIN digital circuit from attempting to transmit when another is already doing so, as is well known in the art.

In operation a signal received on line 46*a* by high voltage LIN transceiver 14*a* is directed from the RX terminal of high voltage transceiver 14*a* to the RX terminal of LIN digital circuit 16*a* and to LIN digital circuit 52. From there control logic 22*a* perceives the request and if it is for information available on one of sensor lines 24*a*, control logic 22*a* provides that data to LIN digital circuit 16*a* which then places it on its TX terminal which provides one input to logic circuit 50 which may typically be implemented by an AND gate 54. Since the master will address its request to die 10*a* or die 12*a*, in this case die 10*a*, using the PID field in the LIN protocol only LIN digital block 16*a* will be active and the output from LIN digital block 52 will be high. Thus the AND gate will be enabled and will faithfully transmit the signals from TX terminal of LIN digital circuit 16*a* to the transmit TX terminal of high voltage transceiver 14*a* where they will be placed on line 46*a*. If the incoming signal seeks a quantity measured by one of the sensor lines 44*a* on die 12*a*, control logic 22*a* ignores the request and control logic 42*a* responds, the data is extracted and delivered through LIN digital circuit 52 to its terminal TX. It is noted that the LIN sync and break signals are received by both dies. Therefore both dies can calibrate to the external LIN master. Since the request was addressed to die 12*a*, at this time LIN digital circuit 16*a* is not active its default high logic signal will have enable AND gate 54 and so the data from terminal TX of LIN digital circuit 52 will be transmitted faithfully by AND gate 54 to high voltage transceiver 14*a*. The high voltage transceiver 14*a* represents the high voltage portion of the LIN compliant physical layer while the LIN digital circuit 16*a* represents the digital timing and formatting portion of the LIN compliant physical layer. With this configuration the program code of a stand alone die 10*a* does not need to be modified to accommodate die 12*a*. Die 12*a* can operate as an independent LIN bus slave. This LIN bus sharing mechanism relies on the fact that when either of the LIN digital signals are idle the logic gate 50 allows the other to transmit a dominate state (logic 0). Die 10*a* and die 12*a* can interchange data by capturing data requested by the master and transmitted by the other die e.g. if the LIN master requests the temperature from die 10*a* then die 12*a* can monitor the response of die 10*a* and take the temperature information for processing as part of its algorithm.

Figure 3:
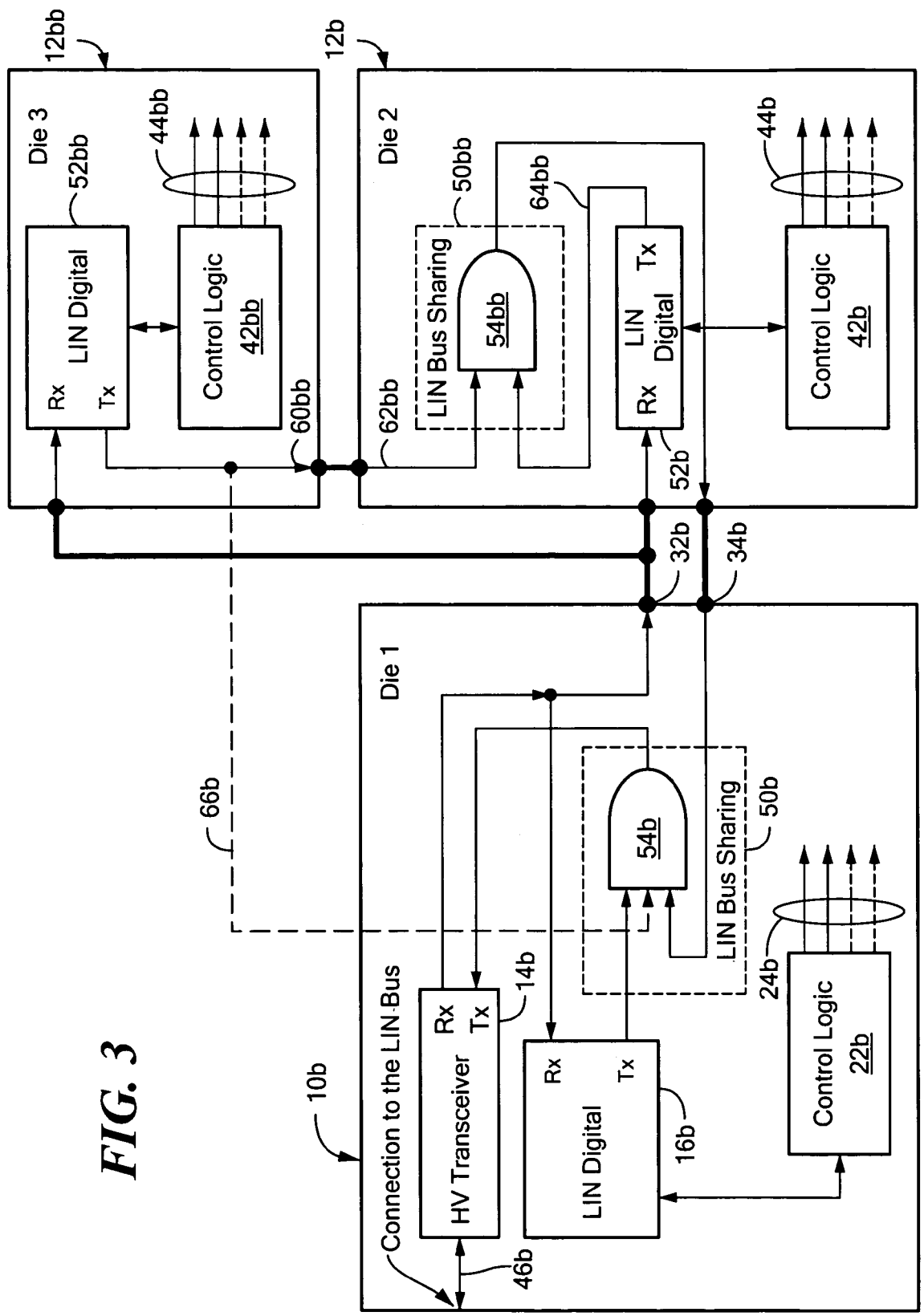
FIG. 3 is a schematic block diagram of a circuit die to circuit die interface system similar to FIG. 2 with more than one secondary circuit die.

One or more additional secondary dies 12*bb*, FIG. 3, may be added providing similar efficiencies and advantages of the invention. For example, secondary die 12*bb* includes another LIN digital circuit 52*bb* and control logic 42*bb* with sensor lines 44*bb*. Now secondary die 12*b* also includes another logic circuit 50*bb* which may be implemented using an AND gate 54*bb*. The transmit output of LIN digital circuit 52*bb* is provided over line 60*bb* to provide one input on line 62*bb* to AND gate 54*bb* the other input 64*bb* comes from LIN digital circuit 52*b*. Logic circuit 50*bb* may just as well be on die 12*bb* instead of die 12*b*. All of the secondary dies except one will in accordance with this scheme have a logic circuit and all of the logic circuits will be cascaded as shown by the connection of AND gate 54*bb* with AND gate 54*b*. Any number of cascaded dies could share the LIN bus, all receive the same RX output from the high voltage transceiver 14*b*. No modifications to die 10*b* are required. Instead of adding additional logic circuits 50 the TX output of each LIN digital circuit 52*bb* could be introduced to a single multiple input logic circuit 50*b* on die 10*b* shown by phantom line 66*b*. In that case logic circuit 50*b* could be implemented by a multiple input AND gate 54*b*.

Figure 4:
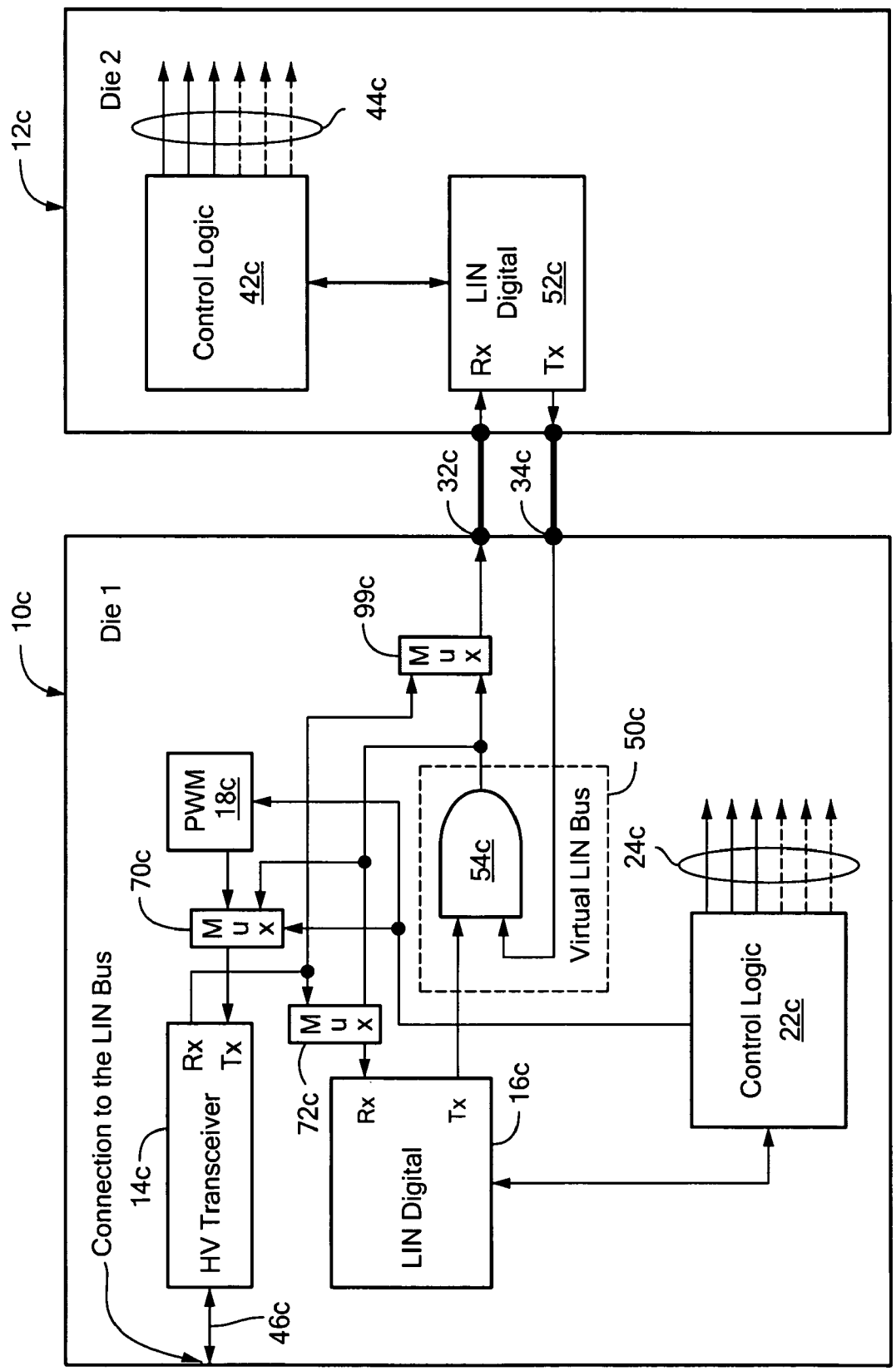
FIG. 4 is a schematic block diagram of a circuit die to circuit die interface system similar to FIG. 2 wherein the PWM and LIN protocols are employed and the circuit dies communicate internally.

PWM 18*c* is restored to the drawings in FIG. 4 and both the LIN circuit including high voltage UN transceiver 14*c* and LIN digital circuit 16*c* as well as PWM and/or SENT 18*c* (not shown) are enabled. There are three mux circuits 70*c*, 72*c* and 99*c*. Mux 70*c* under control of control logic 22*c* passes either the output of PWM 18*c* or the output of AND gate 54*c* to the TX input of high voltage transceiver 14*c*. Mux 72*c* passes either the RX signal from high voltage transceiver 14*c* or the output AND gate of 54*c* to the RX input of LIN digital circuit 16*c*.

In operation, in one mode control logic 22*c* provides the output from PWM 18*c* through high voltage transceiver 14*c* terminal TX to the output 46*c* while simultaneously providing a path from LIN digital block 16*c* on die 10*c* through AND gate 54*c* to the RX input of LIN digital block 52*c* on die 12*c* which allows LIN digital block 16c to operate as a LIN master for UN digital block 52c on die 12c. LIN digital block 52c can then respond to the request through its TX pin of block 52c, through the AND gate 54c where it will be received on the RX input of 16c. In this way die 10c implements a PWM unidirectional interface to the outside world and uses the LIN digital block 16c and AND gate 54c and lines 32c and 34c to get the information it needs from die 12c. A SENT interface would be implemented with a SENT block (not shown) replacing or in parallel to the PWM block, in an identical fashion. In configurations using PWM or SENT to interface to the outside world the die may initially power up in LIN mode for configuration, calibration and programming. Once programmed the parts may choose UN, SENT or PWM as external interfaces depending on that programming. Or there could be provided both a SENT and PWM block as shown at 18c.

Alternatively, to implement a LIN interface to the outside world, control logic 22c may provide the output of AND gate 54c through mux 70c to the transmit TX terminal of high voltage transceiver 14c and it may also provide the RX output of block 14c to the receive RX input of LIN digital circuit 16c through mux 72c and to the RX input of 52c through mux 99c. In this way both Die 10c and Die 12c receive the LIN master commands and the appropriate die can respond with AND gate 54c combining the LIN digital TX signals to drive HV transceiver 14c One difference between this configuration and the previous one in FIG. 3 is the source of the LIN digital circuit 16c RX. In FIG. 4 when PWM or SENT being used as the external communications mode either die 10c or die 12c may act as the LIN master or a different protocol entirely may be used. The AND gate implements a virtual LIN bus, where either die 10c or 12c may act as the LIN master for inter die communications.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A circuit die to circuit die interface system comprising: a first circuit die including a first local interconnect network (LIN) digital circuit having a first default signal; at least a second circuit die including a second LIN digital circuit having a second default signal; and a logic circuit being disposed on one of said first and second circuit dies and being enabled by a default signal from all but one of said first and second circuit dies to transmit a communication signal from the remaining circuit.

2. The circuit die to circuit die interface system of claim 1 in which said first circuit die includes a high voltage LIN transceiver.

3. The circuit die to circuit die interface system of claim 1 further comprising:
a transceiver circuit disposed on the first circuit die.

4. The circuit die to circuit die interface system of claim 3 in which the transceiver circuit is a high voltage transceiver circuit.

5. A circuit die to circuit die interface system of claim comprising: a first circuit die with a first circuit having a first default signal; at least a second circuit die with a second circuit having a second default signal; and a logic circuit being disposed on one of said first and second circuit dies and being enabled by a default signal from all but one of said first and second circuits to transmit a communication signal from the remaining circuit, in which said first circuit includes a first local interconnect network (LIN) digital circuit which has a logic high default level and a high voltage LIN transceiver, and in which each said second circuit includes a second LIN digital circuit.

6. The circuit die to circuit die interface system of claim 5 in which said first and second default signals have a same level.

7. The circuit die to circuit die interface system of claim 6 in which said same level is a logic high.

8. The circuit die to circuit die interface system of claim 7 in which said logic circuit includes an AND circuit.

9. The circuit die to circuit die interface system of claim 5 in which said first and second LIN digital circuits provide said first and second default signals.

10. The circuit die to circuit die interface system of claim 5 in which said logic circuit is disposed on said first circuit die.

11. The circuit die to circuit die interface system of claim 5 in which said first circuit die includes a control logic circuit.

12. A circuit die to circuit die interface system comprising:
a first circuit die with a first circuit having a first default signal;
at least a second circuit die with a second circuit having a second default signal; and
a logic circuit being disposed on one of said first and second circuit dies and being enabled by a default signal from all but one of said first and second circuits to transmit a communication signal from the remaining circuit,
in which
there are a plurality of second circuit dies,
all but one include logic circuit,
all said logic circuits on said first and second circuit dies have two inputs, and
all said logic circuits are cascade connected.

13. The circuit die to circuit die interface system of claim 12 in which said first and second digital circuits provide said first and second default signals.

14. The circuit die to circuit die interface system of claim 12 in which said logic circuit is disposed on said first circuit die.

15. The circuit die to circuit die interface system of claim 12 in which said first circuit die includes a control logic circuit.

16. A circuit die to circuit die interface system comprising:
a first circuit die with a first circuit having a first default signal;

at least a second circuit die with a second circuit having a second default signal; and a logic circuit being disposed on one of said first and second circuit dies and being enabled by a default signal from all but one of said first and second circuits to transmit a communication signal from the remaining circuit, in which there are a plurality of second circuit dies, and said logic circuit receives as an input the default signals from each of said first and second circuit dies.

17. The circuit die to circuit die interface system of claim 16 in which said first and second digital circuits provide said first and second default signals.

18. The circuit die to circuit die interface system of claim 16 in which said logic circuit is disposed on said first circuit die.

19. The circuit die to circuit die interface system of claim 16 in which said first circuit die includes a control logic circuit.

20. A circuit die to circuit die interface system of claim comprising: a first circuit die with a first circuit having a first default signal; at least a second circuit die with a second circuit having a second default signal; and a logic circuit being disposed on one of said first and second circuit dies and being enabled by a default signal from all but one of said first and second circuits to transmit a communication signal from the remaining circuit, in which said first circuit includes a first local interconnect network (LIN) digital circuit which has a logic high default level and a high voltage LIN transceiver circuit, in which said first circuit die includes a control logic circuit, and in which said first circuit die further includes a pulse width modulation (PWM) transceiver circuit.

21. The circuit die to circuit die interface system of claim 20 in which said first circuit die further includes first, second and third multiplexers, and on the first circuit die, said control logic circuit enables said multiplexers to selectively connect an output of said PWM transceiver circuit to an input of said high voltage LIN transceiver circuit and an output of the high voltage LIN transceiver circuit to an input of a LIN digital circuit, or connect an output of the logic circuit to the high voltage LIN transceiver circuit input and the LIN digital circuit input for enabling said first and second circuit dies to communicate internally with each other.

22. An interface system comprising: two dies in one package including a first die containing a local interconnect network (LIN) physical block and a LIN digital block, single edge nibble transmission (SENT) digital and pulse width modulation (PWM) digital blocks and a second die containing a LIN digital block; a first logic circuit disposed on the first die to combine the outputs of the LIN digital blocks from the two dies; a second logic circuit disposed on the first die to allow the combined outputs of the LIN digital blocks an output of the PWM digital block, or an output of the SENT digital block to drive an input of the LIN physical block; and a third logic circuit disposed on the first die to route one of the output of the LIN physical block and an output of the first logic circuit to inputs of the LIN digital blocks.

* * * * *